Figure 1:
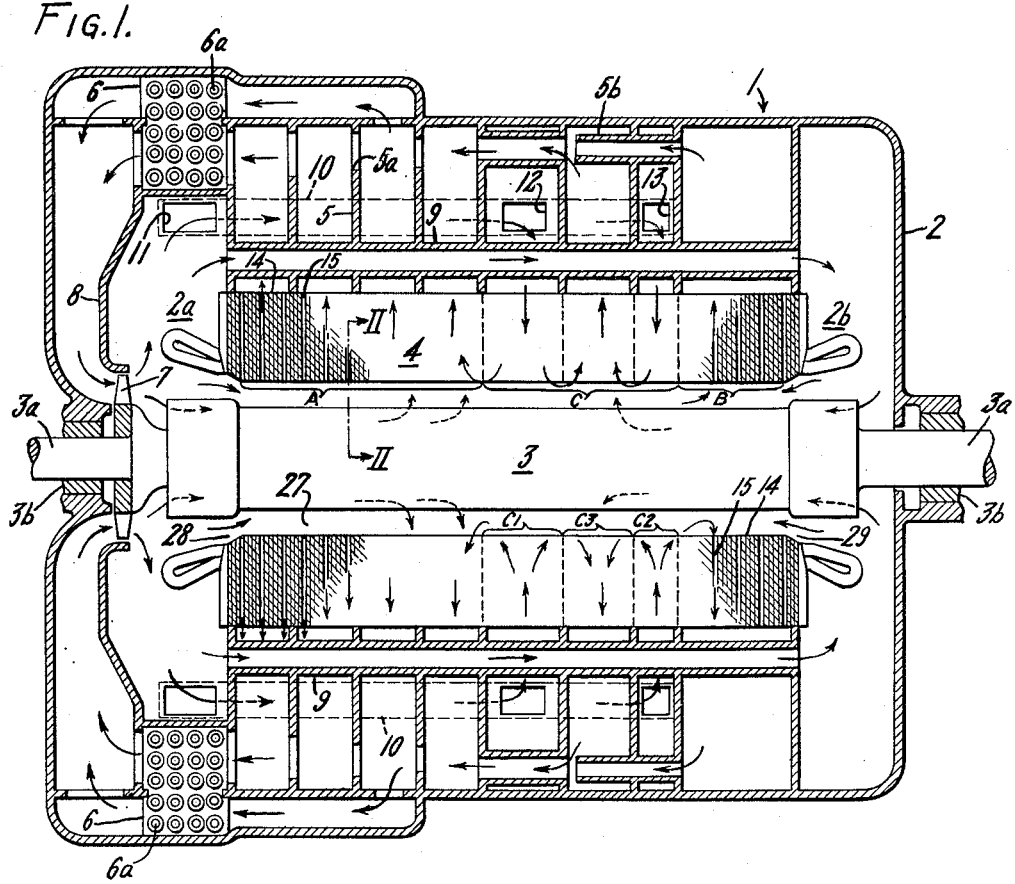

May 28, 1963 A. C. SHARTRAND ETAL 3,091,710
GAS-COOLED DYNAMOELECTRIC MACHINE WITH ASYMMETRICAL FLOW
Filed Aug. 30, 1961

INVENTORS
ALLAN C. SHARTRAND
ALBERT J. OTTESON
BY W. C. Crutcher
THEIR ATTORNEY

United States Patent Office 3,091,710
Patented May 28, 1963

3,091,710
GAS-COOLED DYNAMOELECTRIC MACHINE WITH ASYMMETRICAL FLOW
Allan C. Shartrand and Albert J. Otteson, Scotia, N.Y., assignors to General Electric Company, a corporation of New York
Filed Aug. 30, 1961, Ser. No. 134,966
5 Claims. (Cl. 310—57)

This invention relates to an improved arrangement for cooling a dynamoelectric machine of the type where the laminated armature core is cooled with gas flowing radially with respect to the air gap.

Previous constructions of totally enclosed gas-cooled dynamoelectric machines where the cooling gas is recirculated by fans through the parts of the machine and over enclosed heat exchangers to cool the gas, are well known. Such machines have often utilized radial flow to or from the air gap by employing spacers or other means between packages of the core laminations so as to provide a large number of parallel flow paths, thus reducing the resistance to flow. This type of cooling, together with the desire to avoid too many longitudinal ducts in the machine which tend to increase its over-all diameter, has caused a symmetrical arrangement to be favored with each half of the machine having its own separate cooling system, including coolers and fans.

Another factor favoring coolers and fans on both ends of the machine is the fact that the coolers need not be so densely packed with cooling tubes in order to lower the gas temperature in the time available, since only half of the gas flows through the coolers on each end of the machine. With densely packed coolers, a substantial pressure drop takes place across the coolers, which either reduces the flow of gas or requires more power to pump the gas against the additional pressure loss.

Although dynamoelectric machines have been proposed with coolers on only one end of the machines, these have generally been very high capability machines employing "direct cooling" where the cooling gas is forced through small ducts or passages inside the ground insulation. With such direct cooling designs, high fan pressure differentials are commonly employed, where the consequence of a loss in pressure when passing through a densely packed cooler is of less concern.

When attempting to design a radial flow machine with fans and coolers on only one end of the machine, the designer is confronted with the difficulty of obtaining uniform flow through the radial cooling passages. If the total gas is injected into the air gap for unidirectional radial flow outward, the radial passages at the far end of the machine are "starved" for cooling gas. On the other hand, if a portion of the gas is conducted to the far end of the machine through longitudinal ducts so that gas can be supplied to the air gap from both ends, the gas flowing to the far end of the machine inherently tends to encounter greater resistance due to the passages and, for equal flows, will undergo a greater pressure drop. The air gap absolute pressure will then be different on opposite ends of the machine, promoting useless longitudinal gas flow.

One approach has been to use flow-restricting baffles at the end of the air gap on the fan end in order to create a flow resistance equal to that encountered by the gas flowing to the far end of the machine. Although this may serve to balance the flow, it increases the total resistance to flow and hence the power to recirculate the coolant. The present invention overcomes these difficulties and provides uniform flow through the radial flow passages.

Accordingly, one object of the invention is to provide an improved and economical cooling arrangement for a dynamoelectric machine of the non-direct-cooled type where the laminated armature core is cooled with gas flowing radially with respect to the air gap.

Another object of the invention is to provide an improved flow arrangement for a gas-cooled dynamoelectric machine having fans and coolers on only one end of the machine.

Another object of the invention is to provide an improved arrangement for balancing the flow through the radial cooling passages of a dynamoelectric machine.

Figure 2:
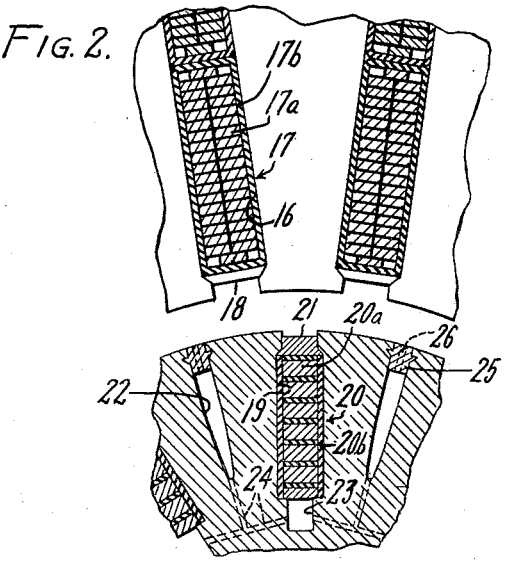

The subject matter which is regarded as the invention is particularly pointed out and distinctly claimed in the concluding portion of this specification. The invention, however, both as to organization and method of practice, together with further objects and advantages thereof, may best be understood by reference to the following description, taken in connection with the accompanying drawing in which:

FIG. 1 is a modified plan view, in diagrammatic form, of a gas-cooled generator showing the cooling flow pattern; and FIG. 2 is a cross sectional view through the rotor and stator winding slots, taken along lines II—II of FIG. 1.

Briefly stated, the invention is practiced by locating the gas cooling and recirculating means at only one end of the machine. The stator cooling gas is fed in at least two parallel flows in an asymmetrical manner in order to balance the flow through the radial stator core cooling passages and to substantially equalize the pressure in the air gap.

Referring now to FIG. 1 of the drawing, a turbine-generator 1 includes a gas-tight casing 2 containing a cooling gas such as hydrogen. A rotor, shown generally at 3, has spindle portions 3a passing through casing 2 and is rotatably mounted in bearings 3b. A cylindrical stator core shown generally at 4 is supported in casing 2 by axially spaced section plates, one of which is seen at 5. Other structural members, such as stator core spring mounting, axial tie rods, etc., are not shown since they are not material to the present invention. The section plates 5 define holes 5a or carry pipes 5b to allow the longitudinal flow of cooling gas returning to gas coolers 6. Two such coolers 6 are employed in the present embodiment, one on the right side and one on the left side of the machine, as seen from the plan view of FIG. 1, and are preferably disposed with tubes 6a running vertically. Tubes 6a are generally supplied with suitable heat exchange fins, and a liquid coolant such as water is circulated through the tubes to cool the gas flowing past the tubes.

On the same end of the machine as coolers 6 is a single-stage row of fan blades 7 disposed on rotor spindle 3a. A flow-directing member 8 conducts gas radially inward from coolers 6 to the low-pressure side of fan blades 7.

End chambers 2a, 2b are defined between the casing and the stator core 4 at either end of the machine. Chambers 2a and 2b are connected by a number of circumferentially spaced pipes 9 which carry the cooling gas axially through section plates 5.

There are also a number of external pipes 10 which carry the gas axially over part of the stator length. The gas enters pipes 10 through opening 11 and is discharged back into the casing through the axially spaced openings 12, 13.

The stator core 4 is made up of thin laminations 14 which are grouped in packages. The packages are axially spaced and define radial cooling passages 15.

Reference to FIG. 2 of the drawing, which is a cross-section along lines II—II, will show that stator laminations 14 also define circumferentially spaced, axially extending winding slots 16, in which are disposed armature bars shown generally as 17, held in place by slot wedges 18. Armature bars 17 comprise solid lightly insulated strands 17a surrounded by heavy ground insulation 17b.

FIG. 2 also indicates that rotor 3 defines similar circumferentially spaced, axially extending winding slots 19. Winding slots 19 contain a field winding shown generally as 20, which includes insulated strands 20a, surrounded by ground insulation 20b. Field winding 20 is held against centrifugal force by wedges 21.

Additional circumferentially spaced, axially extending slots 22 in the rotor teeth and sub-slots 23 are employed to carry cooling gas longitudinally along the rotor, and they are cross connected by conduits 24. Tooth slots 22 are closed at the top by wedges 25. Near the center of the rotor, however, outlet ports 26 in wedges 25 allow the escape of cooling gas from tooth slots 22 in the manner indicated by the arrows shown in FIG. 1.

Referring back to FIG. 1 of the drawing, it may be seen that the rotor 3 is radially separated from the stator 4 by an annular air gap 27. Unobstructed openings to air gap 27 from either end of the rotor are provided by an annular opening 28 on the fan end, and an annular opening 29 on the opposite end. It should be noted that openings 28, 29, are not choked down by baffle rings or shrouds.

The radial flow passages 15 in stator 4 may be divided into three groups or zones for purposes of discussion. The first is indicated by bracket A on the drawing, fed from the fan end through annular opening 28, with the flow radially outward through passages 15 as indicated by the arrows. The second group is indicated by bracket B on the other end of the generator and fed through pipes 9 and annular opening 29 with the flow radially outward, as indicated by the arrows. The third group is indicated by bracket C on the drawing and fed by external pipes 10 through openings 12, 13. Group C may be divided into two subgroups C1, C2 of radially inwardly flowing gas and a subgroup C3 of outwardly flowing gas, as indicated by the brackets. The subgroup C1 nearest the fan 7 has more radial cooling passages than subgroup C2 away from the fan.

It will particularly be observed that group A occupies almost one-half of the length of air gap 27, group B occupies about a fourth of the length on the other end of the air gap, and group C occupies the remaining one-fourth of the length. Thus, the radially fed group C is asymmetrical with respect to the center of the stator core and the end-fed group A is substantially twice the length of the end-fed group. B. Also subgroup C3 is asymmetrically placed with respect to subgroup C1, C2.

The flow of gas to group A from the fan 7 is directly through annular opening 28, radially outward through radial passages 15, and through the section plate holes 5a to cooler 6, as indicated by the arrows.

The flow to group B is from fan 7 to the far end of the machine through pipes 9 into the end chamber 2b, and thence through annular opening 29 to the air gap. From the air gap the gas returns to the cooler through radial passages 15, pipes 5b and holes 5a as shown. Excluding the resistance to flow offered by the radial cooling passages 15, the additional resistance encountered by flow B in traveling to the far end of the machine and back is much greater than that encountered by flow A.

The supply to group C is from fan 7 through opening 11, along the external pipe 10 and inward to the casing again through openings 12, 13 feeding subgroups C1, C2 respectively. The flow is then radially inward to air gap 27 and, reversing direction at the air gap, the main flow then is outward through outlet subgroup C3 and then axially to the cooler 6. A small portion of the gas entering at C1, C2 is also diverted into zones A and B as indicated by the arrows.

Rotor cooling is carried out in a well known manner, as can be seen by reference to both FIGS. 1 and 2 of the drawing. Gas enters at either end of the rotor under the retaining ring, then through tooth slots 22 and subslots 23, and flows toward the center of the rotor to discharge from air gap discharge passages 26. The flow longitudinally through the rotor is primarily produced by the rotor self-pumping action due to the difference in radial height between the inlet and outlet passages on the rotor, whereas the asymmetrical stator cooling flow is primarily produced by fan 7 on the rotor.

The operation of the improved asymmetrical flow arrangement is as follows: The lowest resistance to flow through radial cooling passages 15 would be obtained by feeding all of these passages in parallel from a single source. However, with a fan on only one end of the core, the greater distance to the radial cooling passages on the far end of the machine away from the fan, combined with the longer return passages back to the cooler, would result in "starving" the furthermost radial passages with resultant non-uniform cooling in the core. Previous symmetrically divided generators with fans and coolers on both ends of the generator solved this problem by effectively dividing the core in half and cooling each end of the stator with its own fan and cooler. With the fan and cooler on only one end of the machine, however, a basic difficulty arises when it is attempted to divide the flow and cool each end of the core separately. This is caused by the inherent greater flow resistance required to conduct the gas the length of the machine through pipes 9 to the far end chamber 2b. The flow resistance encountered by the gas flowing through pipes 9 and through the air gap inlet 29 to group B is, therefore, much greater than the flow resistance through air gap inlet 28 to group A. For equal quantities of gas flowing to group A and zone B, therefore, the pressure drop encountered by the gas flowing to group B would be greater and the air gap pressure at A would be greater than the air gap pressure at B. Although the flow resistance leading up to zone B is inherently greater than the flow resistance leading to zone A and cannot be reduced below a minimum value due to basic physical considerations of the machine, these resistances vary with the cubic feet per minute of the gas flowing through them. This is due to higher aerodynamic losses associated with high gas velocity than with a lower gas velocity. Therefore, in order to substantially equalize the pressures at A and B, instead of introducing baffles at 28 to increase the flow resistance leading to A, as is sometimes employed, the proportion of total flow passing to group B is reduced even further beyond that which it would be if groups A and B consisted of equal numbers of radial passages. This is done by reducing the number of radial passages fed in group B to approximately half of those in group A.

It will be noted that the radial passages 15 in both groups A and B are connected in parallel, and that all the radial passages are of the same flow characteristics. Since the proportion of gas flowing to B has been reduced, the air gap pressures at A and B are substantially equal. Therefore, with these two conditions, the pressure drop across each individual radial cooling passage 15 in group A will be approximately the same as the pressure drop across each radial passage 15 in group B. When this criterion is met, uniform cooling results.

The actual selection of the proper number of radial cooling passages may be carried out by trial-and-error using actual pressure measurements. More convenient, however, is the use of a simulated flow model using digital or electrical analog techniques to select the proper portions of stator length occupied by the passages.

The two zones A and B are effectively separated by a third group of passages indicated at C. Group C is cooled by inwardly flowing gas in subgroup C1 fed from opening 12 and also by inwardly flowing gas in subgroup C2 fed from opening 13. Openings 12, 13 are supplied through external pipe 10 and since the distance and hence the flow resistance leading to opening 13 is greater than that leading to opening 12, a similar technique is employed to make the inlet pressure at C1 substantially correspond to that at C2. This is done by reducing the proportion of total flow passing through opening 13 by reducing the number of radial air gap passages 15 in subgroup C2 and increasing the number of radial air gap passages in subgroup C1. From C1 and C2, the gas flows radially outward through C3 and returns to the cooler.

The total number of passages in subgroup C3 are selected both with due regard to the number of passages supplying them through subgroups C1, C2 and with regard to the desired over-all number of passages in group C in relation to groups A and B, so that the total pressure drop encountered by the gas flowing through pipes 10 and subgroups C1, C2 to the air gap is the same as the pressure drops encountered by the gas flowing through the conduits feeding groups A and B. Therefore, all the pressures in the air gap are substantially the same. Also, since the radial cooling passages in each group and subgroup are connected in parallel to the air gap, the pressure drops across each individual radial passage 15 are equal. This is the criteria for uniform cooling, since it means that substantially the same amount of gas will flow through each of the radial cooling passages 15.

Although the radially entering gas feeding group C is shown having two inlets and one outlet section, group C could be comprised of an inlet section only, or more than three subgroups could be employed.

It will also be observed that, although the arrangement shown illustrates group A as occupying substantially the first half of stator length, group C the next quarter of stator length, and group B the last quarter of stator length, some flexibility may be achieved by adjustment in the passages 9 and 10 leading to the end of the generator away from the fan. The optimum results are achieved, however, when the flows A, B and C are balanced to achieve equal pressure drops across the radial passages in each group and substantially equal absolute pressure throughout the lengths of the air gap.

Of course the same asymmetrical cooling principle could be applied if the flow of stator gas were reversed. In this case the gas would flow radially inward through groups A and B and out the ends of the air gap to the fan, then to the coolers, and then to the outside of the stator core. In other words, all flow in the stator would be reversed from that shown by the arrows in FIG. 1. However, the smaller number of radial passages (Group B) would still be located on the end away from the fan as shown.

The direction of rotor gas flow cannot be reversed and would be the same as shown. Additional pipes (not shown) leading from the fan outlet to the ends of the rotor would be required.

Although there has been described what is at present considered to be the preferred embodiment of the invention, it is intended to cover in the appended claims all such modifications as fall within the true spirit and scope of the invention.

What we claim as new and desire to secure by Letters Patent of the United States is:

1. In a gas-cooled dynamoelectric machine, a rotor having fan means disposed at only one end thereof, a stator core defining an air gap with the rotor periphery and also defining a plurality of uniform axially spaced radial cooling passages opening into said air gap, said radial passages comprising a first group of passages at the fan end of the stator core, a second group of passages disposed at the other end of the stator core, and a third group of passages disposed between said first and second groups, first conduit means supplying said first group of passages from the fan end of the air gap, second conduit means including longitudinal pipes supplying said second group of passages from the opposite end of the air gap, and third conduit means supplying said third group of passages radially from the stator periphery, the stator length occupied by each of said first, second and third groups of passages being selected to substantially equalize the pressure along the axial length of the air gap.

2. The combination according to claim 1 wherein said first, second and third groups of radial passages have relative axial lengths along the stator of approximately 2 to 1 to 1 respectively, whereby the third group is disposed asymmetrically away from the fan in the stator core.

3. In a dynamoelectric machine, a stator core defining a plurality of axially spaced radial cooling passages, a primary source of cooling gas disposed at only one end of said stator core, said radial passages comprising a first group of passages on the side nearest said source of coolant gas and a second group of passages disposed on the side of the first group away from said source, conduit means supplying cooling gas longitudinally from said source to said first and second groups on the stator periphery, whereby the gas flows radially inward through the passages, the axial length occupied by said second group being less than that occupied by said first group, whereby the inlet pressures to said first and second groups of radial cooling passages are substantially the same.

4. A gas-cooled dynamoelectric machine having a casing containing a cooling gas, a rotor having fan recirculating means disposed at only one end thereof, cooler means disposed in said casing at the same end as the fan means, a stator core defining an air gap with the rotor periphery and also defining a plurality of axially spaced radial cooling passages communicating with said air gap, said radial passages comprising a first group at the fan end having inlets fed in parallel from the air gap, a second group at the opposite end of the stator core having inlets fed in parallel from the air gap, and a third group of radial passages disposed between said first and second groups and having a plurality of alternate sub-groups of radially inwardly flowing and outwardly flowing passages fed in parallel from the stator periphery or the air gap respectively, first conduit means supplying cooling gas from said fan means to the inlets of the first group of passages from the fan end of the air gap, second conduit means including first longitudinal pipes extending the length of the machine from the fan means and supplying the inlets of the second group of passages from the opposite end of the air gap, third conduit means including second longitudinal pipes extending a portion of the stator length and supplying the inlets of the subgroups of radial in-flowing passages of the third group of radial passages, the portion of the stator length occupied by said second group being less than that occupied by said first group and the portion of the stator length occupied by said third group of radial in-flowing subgroups at a greater distance from said fan means being less than the axial length of the subgroup of in-flowing passages nearer the fan means so as to substantially equalize the pressure of the coolant gas along the axial length of the air gap.

5. The combination according to claim 4 wherein said first, second and third radial passage groups have relative axial lengths along the stator air gap of approximately 2 to 1 to 1 respectively, whereby the third group is disposed asymmetrically in the stator core.

References Cited in the file of this patent

UNITED STATES PATENTS

| | | |
|---|---|---|
| 2,707,242 | Baudry | Apr. 26, 1955 |
| 2,742,582 | Bahn | Apr. 17, 1956 |
| 2,873,393 | Baudry | Feb. 10, 1959 |

FOREIGN PATENTS

| | | |
|---|---|---|
| 52,515 | Norway | May 8, 1933 |